United States Patent
Previdi et al.

(10) Patent No.: US 7,616,574 B2
(45) Date of Patent: *Nov. 10, 2009

(54) DYNAMIC RETRIEVAL OF ROUTING INFORMATION FOR INTER-AS TE-LSPS

(75) Inventors: Stefano B. Previdi, Rome (IT); Jean-Philippe Vasseur, Dunstable, MA (US)

(73) Assignee: Cisco Technology, Inc., San Jose, CA (US)

( * ) Notice: Subject to any disclaimer, the term of this patent is extended or adjusted under 35 U.S.C. 154(b) by 519 days.

This patent is subject to a terminal disclaimer.

(21) Appl. No.: 11/081,097

(22) Filed: Mar. 15, 2005

(65) Prior Publication Data

US 2006/0209716 A1 Sep. 21, 2006

(51) Int. Cl.
*H04L 12/28* (2006.01)
(52) U.S. Cl. .................. 370/238; 370/392; 370/401
(58) Field of Classification Search .......... 370/351, 370/389, 392, 401, 238; 709/242, 223, 238
See application file for complete search history.

(56) References Cited

U.S. PATENT DOCUMENTS

| | | | |
|---|---|---|---|
| 5,088,032 A | 2/1992 | Bosack | |
| 6,392,997 B1 * | 5/2002 | Chen | 370/252 |
| 6,473,421 B1 * | 10/2002 | Tappan | 370/351 |
| 6,567,380 B1 * | 5/2003 | Chen | 370/238 |
| 6,584,093 B1 | 6/2003 | Salama et al. | |
| 6,603,756 B1 | 8/2003 | Tappan | |
| 6,643,706 B1 | 11/2003 | Marques et al. | |
| 6,665,273 B1 * | 12/2003 | Goguen et al. | 370/252 |
| 2001/0025319 A1 | 9/2001 | Takashima et al. | |
| 2001/0053131 A1 * | 12/2001 | Geens | 370/252 |
| 2004/0034702 A1 * | 2/2004 | He | 709/224 |
| 2004/0081154 A1 | 4/2004 | Kouvelas | |
| 2004/0215820 A1 | 10/2004 | Blair | |

(Continued)

OTHER PUBLICATIONS

Rekhter, Y., RFC 1771, entitled A Border Gateway Protocol 4 (BGP-4), Mar. 1995, pp. 1-54.*

(Continued)

*Primary Examiner*—Seema S Rao
*Assistant Examiner*—Mon Cheri S Davenport
(74) *Attorney, Agent, or Firm*—Cesari and McKenna LLP (57) ABSTRACT

A technique dynamically triggers an exchange of reachability information between a tail-end (remote) domain target node (e.g., a tail-end node) of a traffic engineering (TE) label switched path (LSP) and a local domain head-end node of the TE-LSP in a computer network. The inter-domain information retrieval technique is illustratively based on triggering a Border Gateway Protocol (BGP) session whereby at least a portion of the reachability, i.e., routing, information of the tail-end node is transmitted to the head-end node of the TE-LSP in accordance with BGP. Specifically, once a TE-LSP is established between the head-end node and the tail-end node, the head-end node triggers the tail-end node, e.g., through extensions to a request/response signaling exchange, to establish the BGP session. Establishment of the BGP session enables transmission of the routing information from the tail-end node to the head-end node. The head-end node uses the routing information to calculate routes, i.e., address prefixes and associated attributes, reachable from the tail-end node for insertion into its routing table.

24 Claims, 7 Drawing Sheets

U.S. PATENT DOCUMENTS

2005/0050225 A1* 3/2005 Tatman ....................... 709/244

OTHER PUBLICATIONS

PCT Notification of Transmittal of The International Search Report and the Written Opinion of the International Searching Authority, or the Declaration, mailed Aug. 9, 2007, International Application No. PCT/US06/09072, International Filing Date: Mar. 14, 2006, 5 pages.
PCT Written Opinion of the International Searching Authority, mailed Aug. 9, 2007, International Application No. PCT/US06/09072, International Filing Date: Mar. 14, 2006, 7 pages.
U.S. Appl. No. 10/767,574, filed Sep. 18, 2003, Vasseur et al.
U.S. Appl. No. 10/983,280, filed Nov. 5, 2004, Vasseur et al.
U.S. Appl. No. 11/001,459, filed Dec. 1, 2004, Vasseur et al.
U.S. Appl. No. 11/001,349, filed Dec. 1, 2004, Vasseur et al.
U.S. Appl. No. 11/049,587, filed Feb. 2, 2005, Vasseur et al.
Callon, R., RFC 1195, entitled Use of OSI ISIS for routing in TCP/IP and Dual Environments, Dec. 1990, pp. 1-80.
Rekhter, Y., RFC 1771, entitled A Border Gateway Protocol 4 (BGP-4), Mar. 1995, pp. 1-28.
Braden, R. et al., RFC 2205, entitled Resource ReSerVation Protocol (RSVP), Version 1 Functional Specification, Sep. 1997, pp. 1-112.
Moy, J., RFC 2328, entitled OSPF Version 2, Apr. 1998, pp. 1-183.
Awduche, D. et al., RFC 3209, entitled RSVP-TE: Extensions to RSVP for LSP Tunnels, Dec. 2001, pp. 1-43.
Berger, L., RFC 3473, entitled Generalized Multi-Protocol Label Switching (GMPLS) Signaling Resource ReSerVation Protocol-Traffic Engineering (RSVP-TE) Extensions, Jan. 2003, pp. 1-14.
Katz, D. et al., RFC 3630, entitled Traffic Engineering (TE) Extensions to OSPF Version 2, Sep. 2003, pp. 1-14.
Smit, H., RFC 3784, entitled Intermediate-System-to-Intermediate-System (IS-IS) Extensions for Traffic Engineering (TE), Jun. 2004, pp. 1-13.
Mannie, E., RFC 3945, entitled Generalized Multi-Protocol Label Switching (GMPLS) Architecture, Oct. 2004, pp. 1-65.
Mannie, E., RFC 3946, entitled Generalized Multi-Protocol Label Switching (GMPLS) Extensions for Synchronous Optical Network (SONET) and Synchronous Digital Hierarchy (SDH) Control, Oct. 2004, pp. 1-25.
Farrel, A., et al., Network Working Group Internet Draft, entitled Encoding of Attributes for Multiprotocol Label Switching (MPLS) Lable Switched Path (LSP)Establishment Using RSVP-TE, Jul. 2004, pp. 1-18.
Vasseur, J. P. et al., OSPF Work Working Group Internet Draft, entitled OSPF MPLS Traffic Engineering Capabilities (draft-vasseur-ospf-te-caps-00.txt), Jul. 2004, pp. 1-14.
Vasseur, J. P., et al., Network Working Group Internet Draft, entitled RSVP Path Computation Request and Reply Messages (draft-vasseur-mpls-computation-rsvp-05.txt), Jul. 2004, pp. 1-31.
Perlman, Radia, Interconnections Second Edition: Bridges, Routers, Switches, and Internetworking Protocols, Addison Wesley, 1999, Section 12.2.4, pp. 317-319.
Pelsser, Cristel et al., "On the Difficulty of Establishing Interdomain LSPs," IP Operations and Management, Proceedings IEEE Workshop on Beijing, China, Oct. 11-13, 2004, Piscataway, NJ, USA, IEEE, Oct. 11, 2004, pp. 134-139.
Supplementary European Search Report, European Application No. 06738161.6-1249/1859574, PCT/US2006009072, Jul. 31, 2008, pp. 1-9.

* cited by examiner

DYNAMIC RETRIEVAL OF ROUTING INFORMATION FOR INTER-AS TE-LSPS

RELATED APPLICATION

This application is related to U.S. application Ser. No. 11/001,349, entitled PROPAGATION OF ROUTING INFORMATION IN RSVP-TE FOR INTER-DOMAIN TE-LSPS, and U.S. application Ser. No. 11/001,459, entitled INTER-DOMAIN TE-LSP WITH IGP EXTENSIONS, both filed by Vasseur et al. on Dec. 1, 2004, the contents of both of which are hereby incorporated in their entirety.

BACKGROUND OF THE INVENTION

1. Field of the Invention

The present invention relates to computer networks and more particularly to triggering the exchange of reachability information across domains of a computer network.

2. Background Information

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS is generally referred to as a "domain," and a router that interconnects different domains is generally referred to as a "border router."

An example of an interdomain routing protocol is the Border Gateway Protocol version 4 (BGP), which performs routing between domains (ASes) by exchanging routing and reachability information among neighboring interdomain routers of the systems. An adjacency is a relationship formed between selected neighboring (peer) routers for the purpose of exchanging routing information messages and abstracting the network topology. The routing information exchanged by BGP peer routers (BGP speakers or BGP nodes) typically includes destination address prefixes, i.e., the portions of destination addresses used by the routing protocol to render routing ("next hop") decisions. Examples of such destination addresses include IP version 4 (IPv4) and version 6 (IPv6) addresses. BGP generally operates over a reliable transport protocol, such as TCP, to establish a TCP connection/session. The BGP protocol is well known and generally described in Request for Comments (RFC) 1771, entitled *A Border Gateway Protocol 4 (BGP-4)*, published March 1995, the contents of which are hereby incorporated in its entirety.

An intermediate network node often stores its routing information in a routing table maintained and managed by a routing information base (RIB). The routing table is a searchable data structure in which network addresses are mapped to their associated routing information. However, those skilled in the art will understand that the routing table need not be organized as a table, and alternatively may be another type of searchable data structure. Although the intermediate network node's routing table may be configured with a predetermined set of routing information, the node also may dynamically acquire ("learn") network routing information as it sends and receives data packets. When a packet is received at the intermediate network node, the packet's destination address may be used to identify a routing table entry containing routing information associated with the received packet. Among other things, the packet's routing information indicates the packet's next-hop address.

To ensure that its routing table contains up-to-date inter-domain routing information, the intermediate network node may cooperate with other intermediate nodes to disseminate routing information representative of the current network topology. Typically, routing information is disseminated among interconnected intermediate network BGP nodes through advertising BGP update messages, or "BGP advertisements." As used herein, a BGP advertisement generally describes any message used by a BGP routing protocol for communicating routing information among interconnected BGP nodes, i.e., routers and switches. Operationally, a remote BGP node (e.g., of a remote domain) may establish a BGP session with a local BGP node (e.g., of a local domain), and transmit a generated BGP advertisement to the local BGP node. Thereafter, the local BGP node may receive the transmitted BGP advertisement and update its routing table based on routing information contained in the received BGP advertisement. Notably, a BGP session between a local and remote domain (interdomain) is an external BGP (eBGP) session. The local BGP node may then transmit the received BGP advertisement to other BGP nodes of the local domain until each interconnected BGP node of the local domain has received the BGP advertisement and updated its local routing table. Notably, a BGP session within a domain (intradomain) is an internal BGP (iBGP) session. BGP nodes within a domain, such as an AS, are typically connected via a fully meshed iBGP session arrangement to ensure that all BGP nodes receive advertisements from the other BGP nodes in the AS. Notably, eBGP and iBGP are generally referred to herein as "BGP."

Examples of an intradomain routing protocol, or an interior gateway protocol (IGP), are the Open Shortest Path First (OSPF) routing protocol and the Intermediate-System-to-Intermediate-System (IS-IS) routing protocol. The OSPF and IS-IS protocols are based on link-state technology and, therefore, are commonly referred to as link-state routing protocols. Link-state protocols define the manner with which routing information and network-topology information are exchanged and processed in a domain. This information is generally directed to an intradomain router's local state (e.g., the router's usable interfaces and reachable neighbors or adjacencies). The OSPF protocol is described in RFC 2328, entitled *OSPF Version 2*, dated April 1998 and the IS-IS protocol used in the context of IP is described in RFC 1195, entitled *Use of OSI IS-IS for routing in TCP/IP and Dual Environments*, dated December 1990, both of which are hereby incorporated by reference.

Link-state protocols are generally used to disseminate intradomain routing information representative of the current network topology of a particular domain (e.g., the local domain). For example, suppose the intermediate network node (IGP node) detects that one of its neighboring nodes (i.e., adjacent network nodes) becomes unavailable, e.g., due to a link failure or the neighboring node going "off-line," etc. In this situation, the IGP node can update the routing information stored in its routing table to ensure that data packets are not routed to the unavailable network node. Furthermore, the IGP node also may communicate this change in network topology to the other IGP nodes so they, too, can update their local routing tables and bypass the unavailable node. In this manner, each of the IGP nodes becomes "aware" of the change in topology.

In practice, each IGP node typically generates and disseminates ("floods") IGP advertisements to neighboring IGP nodes (e.g., of the local domain) in accordance with a predetermined network communication protocol, such as a link-state protocol (e.g., IS-IS, or OSPF). Conventional link-state protocols use link-state advertisements or link-state packets as the IGP advertisements, in which the routing information includes a list of the intermediate node's neighboring network nodes and one or more "cost" values associated with each neighbor. As used herein, a cost value associated with a neighboring node is an arbitrary metric used to determine the relative ease/burden of communicating with that node. For instance, the cost value may be measured in terms of the number of hops required to reach the neighboring node, the average time for a packet to reach the neighboring node, the amount of network traffic or available bandwidth over a communication link coupled to the neighboring node, etc.

IGP advertisements are usually flooded until each intermediate network IGP node has received an IGP advertisement from each of the other interconnected intermediate nodes. Notably, a BGP node may also be configured as an IGP node, such that certain information received via BGP advertisements (e.g., prefixes in remote domains) may be forwarded to IGP nodes in accordance with IGP advertisements. Then, each of the IGP nodes (e.g., in a link-state protocol) can construct the same "view" of the network topology by aggregating the received lists of neighboring nodes and cost values. To that end, each IGP node may input this received routing information to a "shortest path first" (SPF) calculation that determines the lowest-cost network paths that couple the intermediate node with each of the other network nodes. For example, the Dijkstra algorithm is a conventional technique for performing such an SPF calculation, as described in more detail in Section 12.2.4 of the text book *Interconnections Second Edition*, by Radia Perlman, published September 1999, which is hereby incorporated by reference as though fully set forth herein. Each IGP node updates the routing information stored in its local routing table based on the results of its SPF calculation. More specifically, the RIB updates the routing table to correlate destination nodes with next-hop interfaces associated with the lowest-cost paths to reach those nodes, as determined by the SPF calculation.

Multi-Protocol Label Switching (MPLS) Traffic Engineering has been developed to meet data networking requirements such as guaranteed available bandwidth or fast restoration. MPLS Traffic Engineering exploits modern label switching techniques to build guaranteed bandwidth end-to-end tunnels through an IP/MPLS network of label switched routers (LSRs). These tunnels are a type of label switched path (LSP) and thus are generally referred to as MPLS Traffic Engineering (TE) LSPs. Examples of MPLS TE can be found in RFC 3209, entitled *RSVP-TE: Extensions to RSVP for LSP Tunnels* dated December 2001, RFC 3784 entitled *Intermediate-System-to-Intermediate-System (IS-IS) Extensions for Traffic Engineering (TE)* dated June 2004, and RFC 3630, entitled *Traffic Engineering (TE) Extensions to OSPF Version 2* dated September 2003, the contents of all of which are hereby incorporated by reference in their entirety.

Establishment of an MPLS TE-LSP from a head-end LSR to a tail-end LSR involves computation of a path through a network of LSRs. Optimally, the computed path is the "shortest" path, as measured in some metric, that satisfies all relevant LSP Traffic Engineering constraints such as e.g., required bandwidth, "affinities" (administrative constraints to avoid or include certain links), etc. Path computation can either be performed by the head-end LSR or by some other entity operating as a path computation element (PCE) not co-located on the head-end LSR. The head-end LSR (or a PCE) exploits its knowledge of network topology and resources available on each link to perform the path computation according to the LSP Traffic Engineering constraints. Various path computation methodologies are available including CSPF (constrained shortest path first). MPLS TE-LSPs can be configured within a single domain, e.g., area, level, or AS, or may also span multiple domains, e.g., areas, levels, or ASes.

The PCE is an entity having the capability to compute paths between any nodes of which the PCE is aware in an AS or area. PCEs are especially useful in that they are more cognizant of network traffic and path selection within their AS or area, and thus may be used for more optimal path computation. A head-end LSR may further operate as a path computation client (PCC) configured to send a path computation request to the PCE, and receive a response with the computed path, which potentially takes into consideration other path computation requests from other PCCs. It is important to note that when one PCE sends a request to another PCE, it acts as a PCC. PCEs conventionally have limited or no visibility outside of its surrounding area(s), level(s), or AS. A PCC can be informed of a PCE either by pre-configuration by an administrator, or by a PCE Discovery (PCED) message ("advertisement"), which is sent from the PCE within its area or level or across the entire AS to advertise its services.

One difficulty that arises in crossing domain boundaries is that path computation at the head-end LSR requires knowledge of network topology and resources across the entire network between the head-end and the tail-end LSRs. Yet service providers typically do not share this information with each other across domain borders. In particular, network topology and resource information do not generally flow across area boundaries even though a single service provider may operate all the areas. Neither the head-end LSR nor any single PCE will have sufficient knowledge to compute a path where the LSR or PCE may not have the required knowledge should the destination not reside in a directly attached domain. Because of this, MPLS Traffic Engineering path computation techniques are required to compute inter-domain TE-LSPs.

In order to extend MPLS TE-LSPs across domain boundaries, the use of PCEs may be configured as a distributed system, where multiple PCEs collaborate to compute an end-to-end path (also referred to as "Multi-PCE path computation"). An example of such a distributed PCE architecture is described in commonly-owned copending U.S. patent application Ser. No. 10/767,574, entitled COMPUTING INTER-AUTONOMOUS SYSTEM MPLS TRAFFIC ENGINEERING LSP PATHS, filed by Vasseur et al., on Sep. 18, 2003, the contents of which are hereby incorporated by reference in its entirety. In a distributed PCE architecture, the visibility needed to compute paths is extended between adjacent domains so that PCEs may cooperate to compute paths across multiple domains by exchanging virtual shortest path trees (VSPTs) while preserving confidentiality across domains (e.g., when applicable to ASes).

Some applications may incorporate unidirectional data flows configured to transfer time-sensitive traffic from a source (sender) in a computer network to a destination (receiver) in the network in accordance with a certain "quality of service" (QoS). Here, network resources may be reserved for the unidirectional flow to ensure that the QoS associated with the data flow is maintained. The Resource ReSerVation Protocol (RSVP) is a network-control protocol that enables applications to reserve resources in order to obtain special QoS for their data flows. RSVP works in conjunction with routing protocols to, e.g., reserve resources for a data flow in a computer network in order to establish a level of QoS required by the data flow. RSVP is defined in R. Braden, et al., *Resource ReSerVation Protocol (RSVP)*, RFC 2205. In the case of traffic engineering applications, RSVP signaling is used to establish a TE-LSP and to convey various TE-LSP attributes to routers, such as border routers, along the TE-LSP obeying the set of required constraints whose path may have been computed by various means.

Occasionally, a head-end LSR or node will have multiple TE-LSPs into a particular domain (e.g., an AS) outside of its own domain (i.e., a remote domain). These inter-domain TE-LSPs may terminate at either a single tail-end LSR or node of the remote domain, or at different tail-end nodes within the same remote domain, depending upon their initial setup. A known limitation of such inter-domain TE-LSPs lies in the inability to automatically steer traffic onto such TE-LSPs when attempting to reach nodes or prefixes contained within the domain of the tail-end node. This limitation is primarily due to limited network topology information available to the head-end node. Currently, this lack of reachability information requires the use of static or policy-based routing, which generally requires manual configuration by a system administrator with prior knowledge of the network topology. Such alternatives can be cumbersome and limited in their applicability, and in some cases (e.g., misconfiguration) can be the cause of network failure.

SUMMARY OF THE INVENTION

The present invention is directed to a technique for dynamically triggering an exchange of reachability information between a tail-end (remote) domain target node (e.g., a tail-end node) of a traffic engineering (TE) label switched path (LSP) and a local domain head-end node of the TE-LSP in a computer network. The inter-domain information retrieval technique is illustratively based on triggering a Border Gateway Protocol (BGP) session whereby at least a portion of the reachability, i.e., routing, information of the tail-end node is transmitted to the head-end node of the TE-LSP in accordance with BGP. Specifically, once a TE-LSP is established between the head-end node and the tail-end node, the head-end node triggers the tail-end node, e.g., through extensions to a request/response signaling exchange, to establish the BGP session. Establishment of the BGP session enables transmission of the routing information from the tail-end node to the head-end node. The head-end node uses the routing information to calculate routes, i.e., address prefixes and associated attributes, reachable from the tail-end node for insertion into its routing table.

In the illustrative embodiment described herein, the request/response signaling exchange is embodied as extensions to Resource ReSerVation Protocol (RSVP) TE signaling messages. Notably, the RSVP extensions are, in turn, embodied as new RSVP objects, flags, and/or type/length/value (TLV) encoded formats contained within the RSVP objects. Specifically, the signaling exchange enables the head-end node to request the routing information from the target node by triggering initiation of the BGP session using a new BGP Request (BGP-REQ) flag contained within a Routing Information Request (RI-REQ) object of an RSVP object issued by the head-end node. The RI-REQ object may also contain an identification of the target (tail-end) node of the tail-end domain from which the routing information is requested. In addition, an access control list (ACL) (or an outbound route filter, ORF) may be included within the RI-REQ object that limits the amount of routing information to be returned. For example, the ACL allows the head-end node to request partial routing information, wherein the partial information request is manifested by policy attributes defining a subset of the routing information.

In accordance with one aspect of the present invention, the head-end node requests the establishment of a TE-LSP to the tail-end node using conventional Traffic Engineering techniques (e.g., RSVP Path messages). Upon receiving confirmation that the TE-LSP is established (e.g., an RSVP Resv message), the head end node may then send a trigger (e.g., by asserting the BGP-REQ flag) to the tail-end node of the tail-end domain to initiate a BGP session with the head-end node. Note that the trigger may be sent any configurable time after the receipt of the Resv message (to ensure that a TE-LSP exists prior to transmitting the routing information), such as, e.g., with the first RSVP message sent to the tail-end node after the Resv message (e.g., a state refresh message).

In accordance with another aspect of the present invention, the target node receives the trigger and correspondingly initiates establishment of the BGP session with the head-end node. Notably, the BGP session may be a multi-hop BGP session, such as where there are intermediate nodes between the target node and the head-end node. Once the BGP session is established, routing information of the tail-end node is transferred to the head-end node through BGP advertisements. Upon receiving the BGP advertisements, the head-end node extracts the retrieved routing information and uses that information to calculate routes reachable from the tail-end node for insertion into its routing table.

Advantageously, the novel technique dynamically retrieves inter-domain reachability information from a tail-end domain target node along an established TE-LSP at a local domain head-end node of the TE-LSP. By dynamically informing the head-end node of the reachability information of the tail-end node, the inventive technique provides an alternative to sub-optimal routing techniques, such as cumbersome manual configuration (e.g., static routing or policy routing), that can avoid some of the risks and possible errors created in such sub-optimal routing techniques.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF AN ILLUSTRATIVE EMBODIMENT

Figure 1:
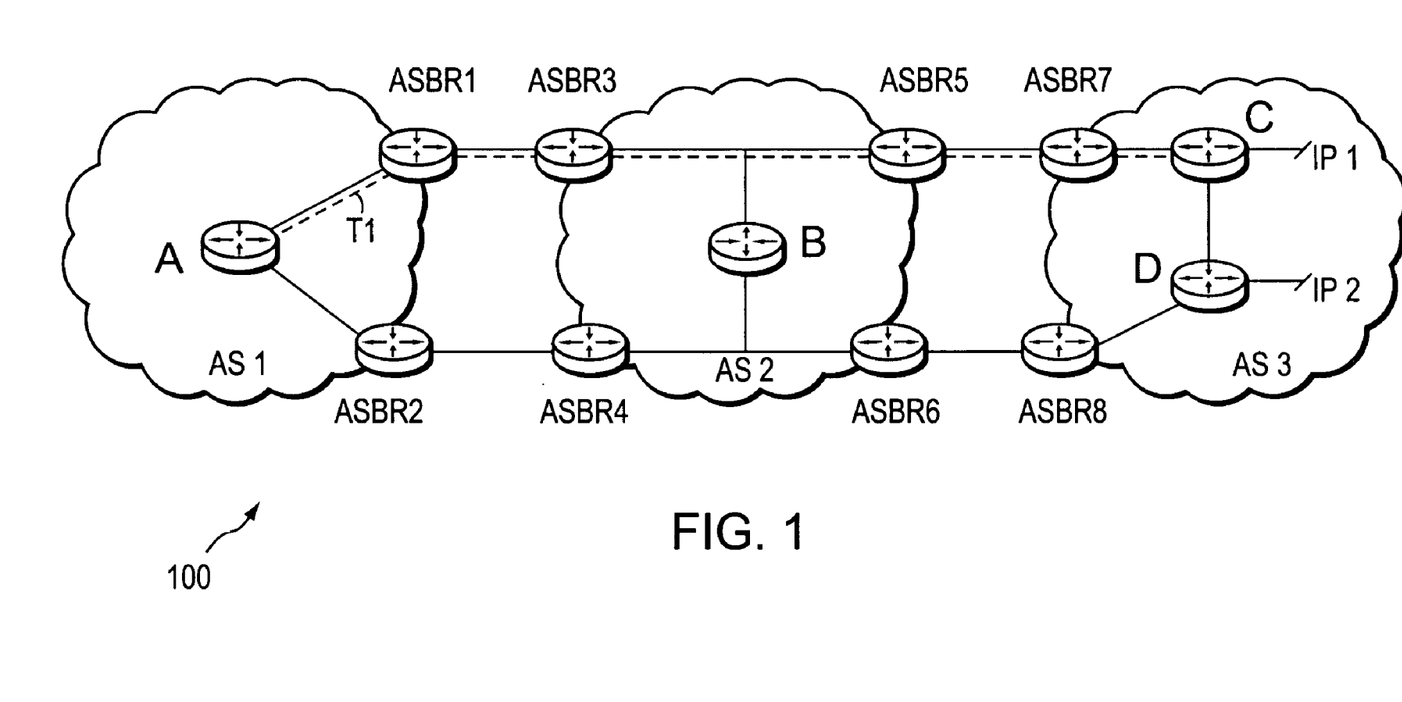
FIG. 1 is a schematic block diagram of an exemplary computer network of autonomous systems that may be used in accordance with the present invention.

FIG. 1 is a schematic block diagram of an exemplary computer network 100 comprising autonomous systems AS1 and AS3 interconnected by autonomous system AS2. An Autonomous System (AS) is herein defined to be a group of intermediate nodes, such as interdomain and/or intradomain routers, within a network that are subject to a common authority and execute one or more interdomain and/or intradomain routing protocols. Although each AS is illustratively an autonomous system, those skilled in the art will appreciate that the ASes may alternatively be configured as routing domains or other networks or subnetworks. To that end, AS1 includes interdomain routers, such as AS border routers ASBR1 and ASBR2, through which communication, such as data packets, may be exchanged with AS border routers ASBR3 and ASBR4, respectively of AS2. AS2 also includes AS border routers ASBR5 and ASBR6 in communication with border routers ASBR7 and ASBR8 of AS3. AS1 and AS2 further include exemplary intradomain routers A and B, respectively, while AS3 includes exemplary intradomain routers C and D. Moreover, address prefixes IP1 and IP2 in AS3 are reachable via routers C and D, respectively. Those skilled in the art will understand that any number of routers may be used in the ASes, and that any number of ASes may be contained within the network 100 interconnected in various other configurations. These examples are merely representative, and the view shown herein is for simplicity.

Data packets may be exchanged among the autonomous systems AS1-AS3 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. Routing information may be distributed among the routers within an AS using predetermined "interior" gateway protocols (IGPs), such as conventional distance-vector protocols or, illustratively, link-state protocols, through the use of link-state advertisements or link-state packets. In addition, data packets containing network routing information may be exchanged among the autonomous systems AS1-AS3 using "external" gateway protocols, such as the Border Gateway Protocol (BGP).

Figure 2:
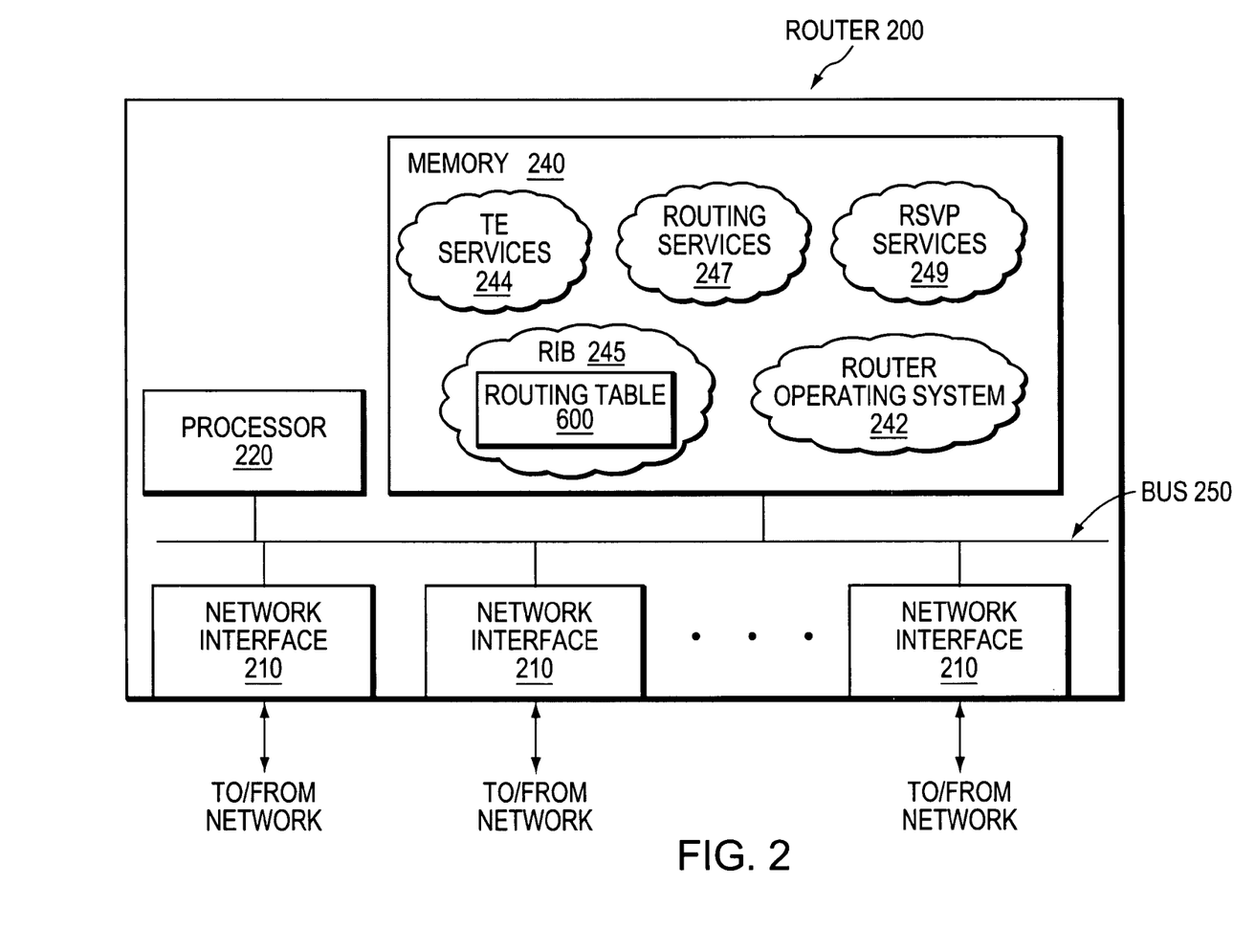
FIG. 2 is schematic block diagram of an exemplary router that may be advantageously used with the present invention.

FIG. 2 is a schematic block diagram of an exemplary router 200 that may be advantageously used with the present invention as an intradomain or interdomain (i.e., border) router. The router comprises a plurality of network interfaces 210, a processor 220, and a memory 240 interconnected by a system bus 250. The network interfaces 210 contain the mechanical, electrical and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc.

The memory 240 comprises a plurality of storage locations that are addressable by the processor 220 and the network interfaces 210 for storing software programs and data structures associated with the present invention. The processor 220 may comprise necessary elements or logic adapted to execute the software programs and manipulate the data structures, such as routing table 600. A router operating system 242, portions of which is typically resident in memory 240 and executed by the processor, functionally organizes the router by, inter alia, invoking network operations in support of software processes and/or services executing on the router. These software processes and/or services include Routing Information Base (RIB) 245, routing services 247, Traffic Engineering (TE) services 244, and RSVP services 249. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as IGP and BGP. These functions may be configured to manage a forwarding information database (not shown) containing, e.g., data used to make forwarding decisions. TE services 244 contain computer executable instructions for operating TE functions in accordance with the present invention. Examples of Traffic Engineering are described in RFC 3209, RFC 3784, and RFC 3630 as incorporated above, and in RFC 3473, entitled, *Generalized Multi-Protocol Label Switching (GMPLS) Signaling Resource ReSerVation Protocol-Traffic Engineering (RSVP-TE) Extensions* dated January 2003, which is hereby incorporated by reference in its entirety. RSVP services 249 contain computer executable instructions for implementing RSVP and processing RSVP messages in accordance with the present invention. RSVP is described in RFC 2205, entitled *Resource ReSerVation Protocol (RSVP)*, and in RFC 3209, entitled *RSVP-TE: Extensions to RSVP for LSP Tunnels*, both as incorporated above.

Network reachability information may be communicated among routers 200 between the domains using BGP advertisements. Suppose, for example, that a new address prefix is established within an AS or a new connection is created between two or more ASes. Once the change in the network's state is detected by one of the BGP enabled routers, that router may transmit a BGP advertisement communicating the change to the other ASes.

Figure 3:
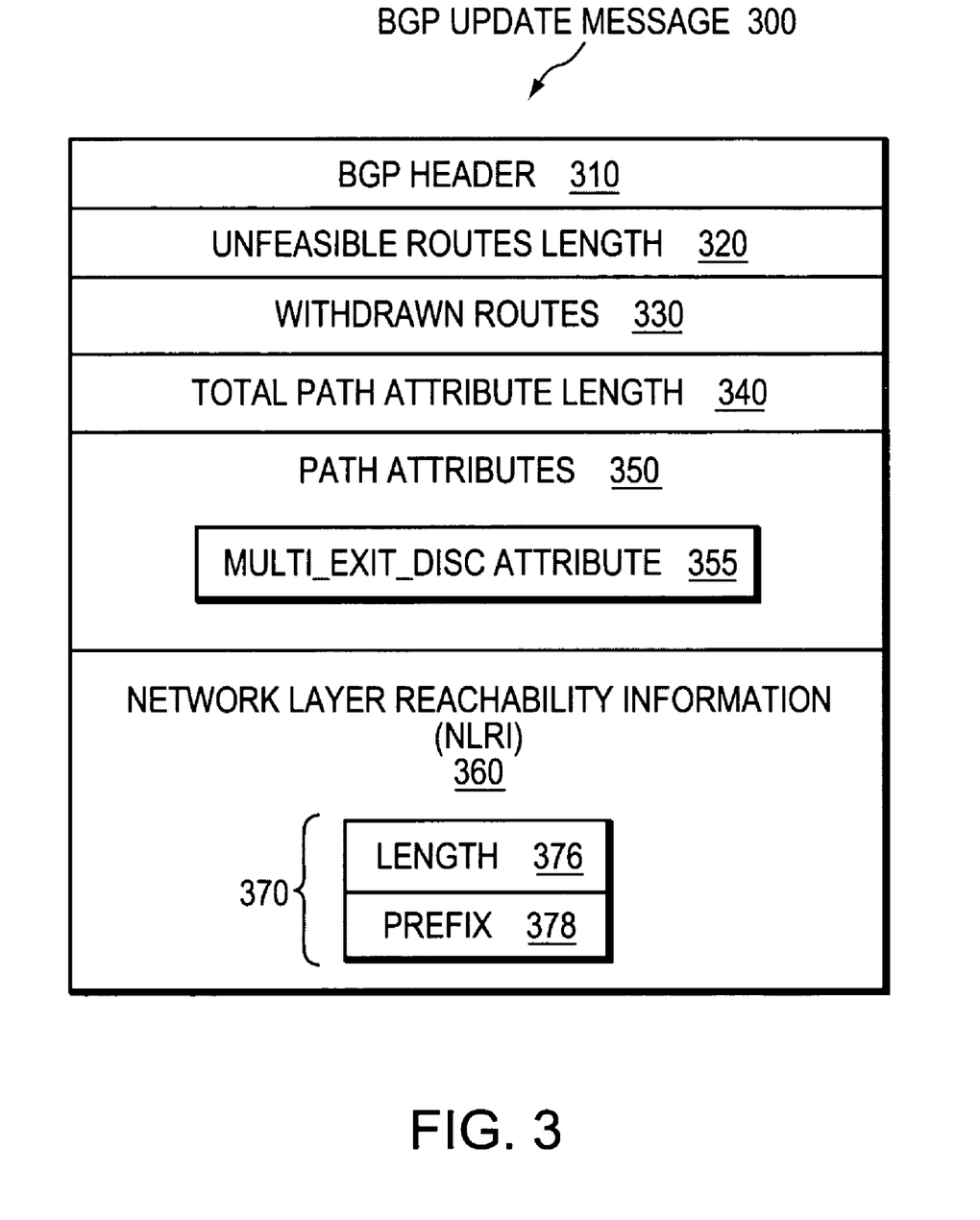
FIG. 3 is a schematic block diagram of an exemplary BGP Advertisement that may be transmitted by the routers.

FIG. 3 illustrates an exemplary BGP advertisement 300 that may be transmitted by BGP enabled routers 200. Illustratively, the BGP advertisement 300 is a BGP update message. The packet includes a BGP header 310, unfeasible routes length field 320, withdrawn routes field 330, total path attribute length field 340, path attributes field 350, and network layer reachability information (NLRI) field 360. The BGP header 310 contains the type of BGP message (e.g., an update message), the overall length of the message, and other known information, such as predictable authentication data. The unfeasible routes length field 320 denotes the variable length of the withdrawn routes field 330, which contains a list of routes that are no longer used (or advertised) by the advertising BGP node. Notably, if the update message 300 only advertises feasible routes, the withdrawn routes field 330 need not be present.

The total path attribute length field 340 indicates the variable length of the path attributes field 350. Path attributes field 350 contains a sequence of optional path attributes, each attribute defining an attribute type, attribute length, and attribute value, such as, inter alia, a MULTI_EXIT_DISC (discrimination) attribute 355. The MULTI_EXIT_DISC attribute ("MED attribute") 355 is a well-known optional attribute that is generally used to discriminate among multiple exit or entry points to the same neighboring AS. Notably, the MED attribute 355 carries a metric (e.g., cost) associated with reaching the advertised prefix from the advertising BGP router. In this way (in its general use), all other factors being equal, the BGP router advertising the lower metric should be preferred. Use of the MED attribute 355 in accordance with the present invention is described further below.

The Network Layer Reachability Information (NLRI) field 360 contains a list of address prefixes, whose length is calculated using the overall length of the BGP message 300 contained within the BGP header 310. Reachability information in the NLRI field 360 comprises one or more encoded entries 370, each containing a length field 376, signifying the length of a prefix field 378. The prefix field 378 contains destination address prefixes that are reachable via, e.g., a tail-end node (node C), as described herein. Notably, a prefix 378 of zero length indicates a prefix that matches all destination addresses. In general, BGP update message 300 can advertise at most one route to a set of destination prefixes, and all path attributes 350 must apply to the entire set of destination prefixes contained in the NLRI field 360.

In one embodiment, the routers described herein are also IP enabled routers that implement Multi-Protocol Label Switching (MPLS) and operate as label switched routers (LSRs). In one simple MPLS scenario, at an ingress to a network, a label is assigned to each incoming packet based on its forwarding equivalence class before forwarding the packet to a next-hop router. At each router, a forwarding selection and a new substitute label are determined by using the label found in the incoming packet as a reference to a label forwarding table that includes this information. At the network egress (or one hop prior), a forwarding decision is made based on the incoming label but optionally no label is included when the packet is sent on to the next hop.

The paths taken by packets that traverse the network in this manner are referred to as label switched paths (LSPs) or Traffic Engineering (TE)-LSPs. An example TE-LSP is shown as a dotted line between a head-end node (A) and tail-end node (C) in FIG. 1. Establishment of a TE-LSP requires computation of a path, signaling along the path, and modification of forwarding tables along the path. MPLS TE establishes LSPs that have guaranteed bandwidth under certain conditions. Illustratively, the TE-LSPs may be signaled through the use of the RSVP protocol, and in particular, RSVP TE signaling messages.

Although the illustrative embodiment described herein is directed to MPLS, it should also be noted that the present invention may advantageously apply to Generalized MPLS (GMPLS), which pertains not only to packet and cell-based networks, but also to Time Division Multiplexed (TDM) and optical networks. GMPLS is well known and described in RFC 3945, entitled *Generalized Multi-Protocol Label Switching (GMPLS) Architecture*, dated October 2004, and RFC 3946, entitled *Generalized Multi-Protocol Label Switching (GMPLS) Extensions for Synchronous Optical Network (SONET) and Synchronous Digital Hierarchy (SDH) Control*, dated October 2004, the contents of both of which are hereby incorporated by reference in their entirety.

Figure 4:
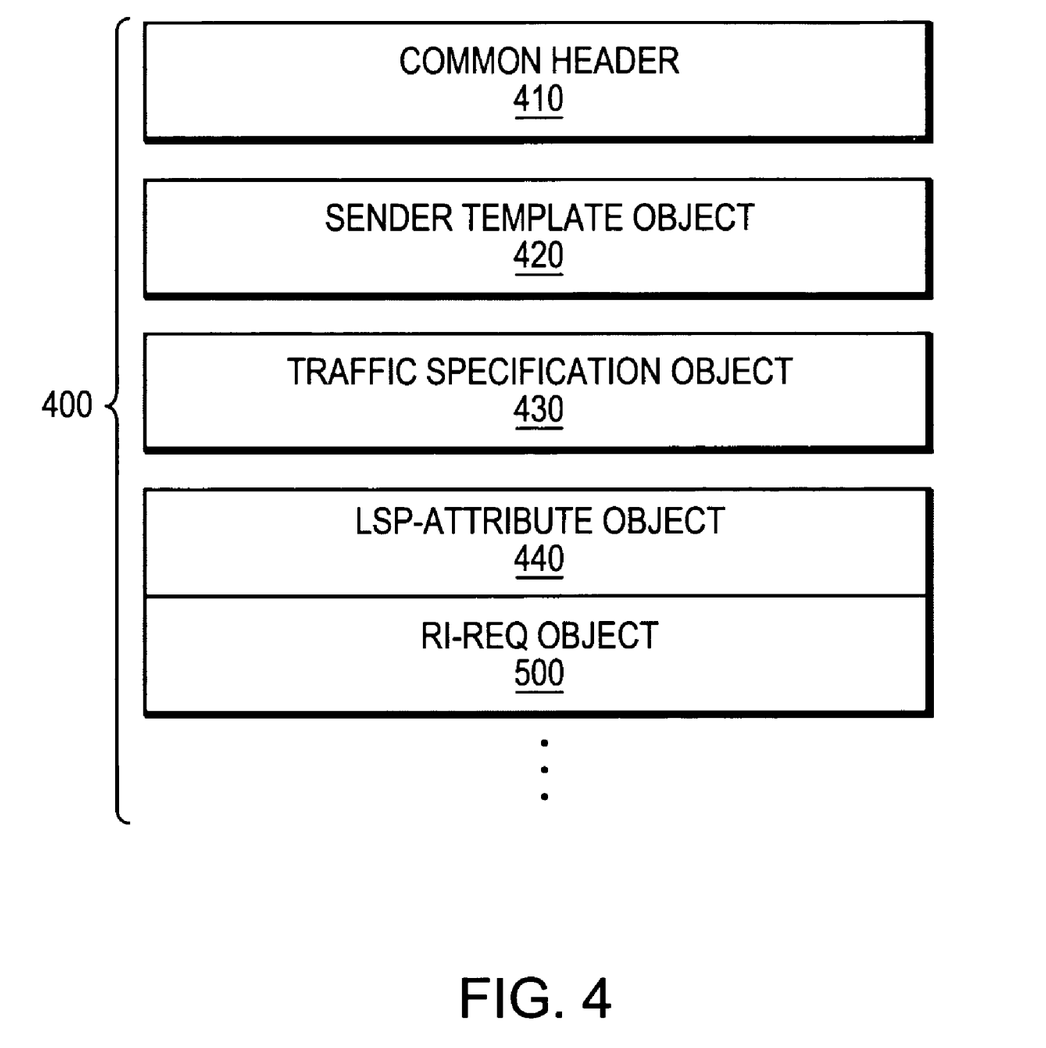
FIG. 4 is a schematic block diagram of portions of an RSVP Path message that may be advantageously used with the present invention.
Figure 5:
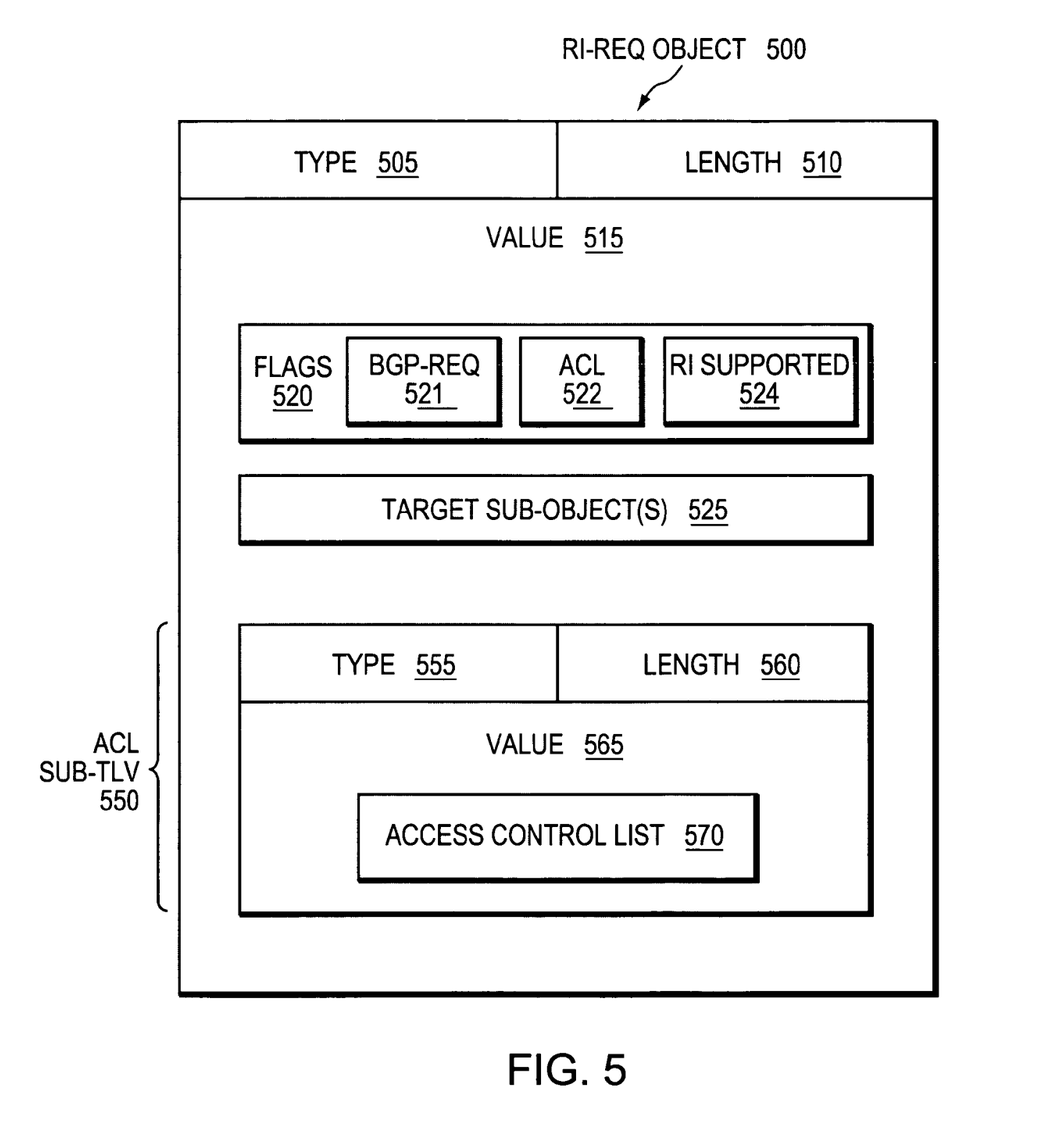
FIG. 5 is a schematic block diagram illustrating the format of a RI-REQ Object that may be advantageously used with the present invention.

In accordance with RSVP, to establish a data flow between a sender (e.g., head-end node A) and a receiver (e.g., tail-end node C), the sender may send an RSVP path (Path) message downstream hop-by-hop along a path (e.g., a unicast route) to the receiver to identify the sender and indicate e.g., bandwidth needed to accommodate the data flow, along with other attributes of the TE-LSP. The Path message may contain various information about the data flow including, e.g., traffic characteristics of the data flow. FIG. 4 is a schematic block diagram of portions of an RSVP Path message 400 that may be advantageously used with the present invention. Message 400 contains, inter alia, a common header 410, a sender template object 420, a traffic specification (Tspec) object 430 and an LSP-Attribute object 440. It should be noted that message 400 may contain other objects including a novel Routing Information Request (RI-REQ) object 500 (described further below). To establish a TE-LSP (data flow) between the receiver and the sender, the receiver may return an RSVP Reserve (Resv) message upstream along the path to the sender to confirm the attributes of the TE-LSP, and provide a TE-LSP label. It should be noted that in accordance with RSVP signaling, the state of the RSVP is refreshed on a timed interval, e.g., every thirty seconds, in which RSVP Path and Resv messages are exchanged. This timed interval is configurable by a system administrator.

To compute paths across multiple domains, previously incorporated U.S. application Ser. No. 10/767,574 describes the use of a virtual shortest path tree (VSPT) algorithm in a distributed path computation element (PCE) architecture where multiple PCEs are involved in the computation of an inter-domain TE-LSP. Alternatively, a forward path computation technique (i.e., from the head-end node to the tail-end node) for an inter-domain TE-LSP in a distributed PCE architecture is described in commonly-owned copending U.S. patent application Ser. No. 11/049,587, entitled INTER-DOMAIN PATH COMPUTATION TECHNIQUE, filed by Vasseur et al., on Feb. 2, 2005, the contents of which are hereby incorporated by reference in its entirety. It will be apparent to those skilled in the art that other methods may be used to compute the TE-LSPs (e.g., loose hops, explicit paths, etc.), and such methods are within the scope of the present invention. Furthermore, the path computation request (and response) between PCC and PCE can be exchanged in accordance with a protocol specified in Vasseur, et al. *RSVP Path Computation Request and Reply Messages <draft-vasseur-mpls-computation-rsvp-05.txt>*, Internet Draft, July 2004, which is hereby incorporated by reference as though fully set forth herein. It should be understood that the use of RSVP serves only as an example, and that other communication protocols may be used in accordance with the present invention.

As an example, assume that all shown border routers in FIG. 1 (ASBR1-8) are further PCE enabled border routers (PCEs). The address of a PCE in a domain (a "local PCE") may be manually configured. Alternatively, the PCE may advertise itself through flooding within the domain using, e.g., path computation element discovery (PCED) techniques in accordance with *OSPF MPLS Traffic Engineering Capabilities (draft-vasseur-ospf-te-caps.txt)* by Vasseur, et al., published July 2004, which is hereby incorporated by reference. A PCED message may include, inter alia, the address of the PCE, and indications of PCE capabilities, such as the ability to compute local paths, inter-area paths, inter-AS paths, multi-domain paths, diverse paths, etc. Knowledge of other PCE addresses may be acquired by way of static configuration or other means as could be readily devised by one of skill in the art. Notably, where multiple PCEs exist in a domain, a technique for selecting a PCE to use is described in commonly-owned copending U.S. patent application Ser. No. 10/983,280, entitled TECHNIQUE FOR SELECTING A PATH COMPUTATION ELEMENT, filed by Vasseur et al., on Nov. 5, 2004, the contents of which are hereby incorporated by reference in its entirety.

The present invention is directed to a technique for dynamically triggering an exchange of reachability information between a tail-end (remote) domain target node (e.g., a tail-end node) of a traffic engineering (TE) label switched path (LSP) and a local domain head-end node of the TE-LSP in a computer network. The inter-domain information retrieval technique is illustratively based on triggering a Border Gateway Protocol (BGP) session whereby at least a portion of the reachability, i.e., routing, information of the tail-end node is transmitted to the head-end node of the TE-LSP in accordance with BGP. Specifically, once a TE-LSP is established between the head-end node and the tail-end node, the head-end node triggers the tail-end node, e.g., through extensions to a request/response signaling exchange, to establish the BGP session. Establishment of the BGP session enables transmission of the routing information from the tail-end node to the head-end node. The head-end node uses the routing information to calculate routes, i.e., address prefixes and associated attributes, reachable from the tail-end node for insertion into its routing table.

In the illustrative embodiment described herein, the request/response signaling exchange is embodied as extensions to Resource ReSerVation Protocol (RSVP) TE signaling messages. Notably, the RSVP extensions are, in turn, embodied as new RSVP objects, flags, and/or type/length/ value (TLV) encoded formats contained within the RSVP objects. TLV encoding is used to identify a type (T) of information being communicated (conveyed), a length (L) of information to be conveyed, and a value (V) of the actual information conveyed. The length (L) parameter contained in a length field of, e.g., a TLV object, is typically implementation-specific and can denote the length from the beginning of the Type field of the object to the end. However, the length generally denotes the length of a Value (V) field and not the Type (T) or Length (L) fields.

Specifically, the signaling exchange enables the head-end node to request the routing information from the target node by triggering initiation of the BGP session using a new BGP Request (BGP-REQ) flag contained within a Routing Information Request (RI-REQ) object of an RSVP object issued by the head-end node. The RI-REQ object is illustratively contained in a RSVP path message 400 and may contain a series of configured flags relating to the requested routing information. The RI-REQ object may also contain an identification of the target (tail-end) node of the tail-end domain from which the routing information is requested. The RI-REQ object is described in detail in above-incorporated application Ser. No. 11/001,349.

FIG. 5 is a schematic block diagram illustrating the format of a RI-REQ object 500 that may be advantageously used with the present invention. The RI-REQ object (TLV) 500 comprises a Type field 505 containing a predetermined RI-REQ object type value and a length field 510 containing a variable length value. A Value field 515 illustratively contains a flags field 520 adapted to store a number of flags, such as, inter alia, a novel BGP-REQ flag 521, an access control list (ACL) (or outbound route filter, ORF) flag 522, and an RI-Supported flag 524, described in further detail below. The Value field 515 also contains a target sub-object 525 used to specify to which tail-end domain target node along the TE-LSP the RI-REQ object 500 is directed (e.g., the tail-end node C). The target sub-object 525 is illustratively an IPv4 sub-object, described in RFC 3209 above.

As noted, the RI-REQ object 500 is contained within an RSVP object, which, illustratively, is an LSP-Attributes object. The LSP-Attributes object is described in detail in Farrel, et al. *Encoding of Attributes for Multiprotocol Label Switching (MPLS) Label Switched Path (LSP) Establishment Using RSVP-TE*, Internet Draft, July 2004, which is hereby incorporated by reference as though fully set forth herein. The object class of the RI-REQ object 500 is preferably in the form of "11bbbbbb," and, as those skilled in the art will understand, is transparently propagated by any intermediate node not supporting the RI-REQ object.

The Value field 515 of the RI-REQ object 500 may further contain a novel ACL (or ORF) sub-TLV (sub-object) 550 that limits the amount of routing information to be returned by the target node. For example, the ACL sub-TLV 500 allows the head-end node to request partial routing information, wherein the partial information request is manifested by policy attributes defining a subset of the routing information. Illustratively, the ACL sub-TLV 550 includes a Type field 555, a Length field 560, and a Value field 565 containing an access control list 570 of address prefixes used to limit the amount of routing information requested from the target node. For example, a head-end node may limit the request to a predetermined set of loopback addresses, subnets, masks, prefixes, communities, etc., associated with, e.g., particular MPLS VPNs (virtual private networks), Points-of-Presence (PoPs), or voice over IP (VoIP) gateways. Notably, the presence of the ACL sub-TLV 550 in the RI-REQ object 500 is indicated by the assertion of ACL flag 522. In the event that the ACL sub-TLV is not present (e.g., the ACL flag is not asserted), the RI-REQ object requests complete routing information from the target node.

In accordance with one aspect of the present invention, the head-end node (A) requests the establishment of a TE-LSP to the tail-end node (C) using conventional Traffic Engineering techniques (e.g., RSVP Path messages). Upon receiving confirmation that the TE-LSP is established (e.g., an RSVP Resv message), the head end node may then send a trigger to the tail-end node of the tail-end domain to initiate a BGP session with the head-end node. The trigger is used to request the set of routes that are reachable via the TE-LSP, and is illustratively sent by asserting the BGP-REQ flag 521 of an RSVP Path message. Note that the trigger may be sent any configurable time after the receipt of the Resv message. Namely, the trigger is sent after confirming the establishment of a TE-LSP to ensure that a TE-LSP exists prior to utilizing system resources for transmitting the routing information. Illustratively, the first RSVP message sent to the tail-end node after the Resv message (e.g., to refresh the state of the TE-LSP) contains the trigger, such that the present invention may be dynamically employed substantially immediately. Those skilled in the art will understand that because an RSVP session is already used to establish and maintain the state of a TE-LSP, the techniques described herein in accordance with the present invention (e.g., a trigger in an RSVP message) require minimal, if any, additional signaling overhead.

In accordance with another aspect of the present invention, the target node receives the trigger and, if supported, correspondingly initiates establishment of the BGP session with the head-end node. In particular, the BGP session is established as an internal BGP (iBGP) session if the head-end node and target node are of the same domain, or an external (eBGP) session if they are in different (remote) domains, e.g., according to an identification of the domain (an AS number). Moreover, those skilled in the art will understand that the head-end domain and the tail-end domain may be the same domain, or separated by one or more external domains. For instance, in FIG. 1, AS3 may be another portion of AS1 located remotely through AS2 (i.e., the arrangement of FIG. 1 may be AS1, AS2, AS1 as opposed to AS1, AS2, AS3), such as, e.g., in a virtual PoP model known to those skilled in the art. Notably, the BGP session may be a multi-hop BGP session, such as where there are intermediate nodes between the target node and the head-end node. A multi-hop BGP session is generally known to those skilled in the art as a BGP session encapsulated in a transport protocol (e.g., IP packets) between the target node and the head-end node. In this way, two BGP speakers that are not immediately adjacent (e.g., node C and node A) may still maintain a BGP session through other intermediate nodes (e.g., ASBRs 7, 5, 3, and 1).

Once the BGP session is established, routing information of the tail-end node (node C) is transferred to the head-end node (node A) through BGP advertisements 300. The BGP advertisements 300 contain typical BGP-related routing information, such as described above. Illustratively, the BGP-related information is limited to the tail-end domain routing address prefixes, i.e., where the tail-end domain is the "originating" domain of a prefix. Those skilled in the art will understand, however, that the BGP-related information need not be limited to the tail-end domain, but may incorporate all BGP information stored at the target node. Cost information associated with the advertised prefixes may also be carried in the BGP advertisements 300 to the head-end node, such as where an agreement between domains exists. Illustratively, the cost metrics (e.g., IGP or BGP cost) maintained by the target node (e.g., in a routing table) may be transmitted to the head-end node through the use of the MULTI_EXIT_DISC (MED) attribute 355. Typically used for discriminating among multiple exits from a domain, the MED attribute 355 carries a metric value associated with the advertised prefix. As such, the MED attribute 355 may be adapted to carry the cost metric associated with reaching an advertised prefix from the tail-end node. Notably, if a node other than the tail-end node (node C) is used as the target node (e.g., ASBR7), the target node transmits either no cost metrics to the head-end node, or computes the costs of the reachable prefixes based on the tail-end node. Specifically, in this latter case, the target node (ASBR7) performs a shortest path first (SPF) computation rooted at the tail-end node (node C) to discover the associated costs.

Figure 6A:
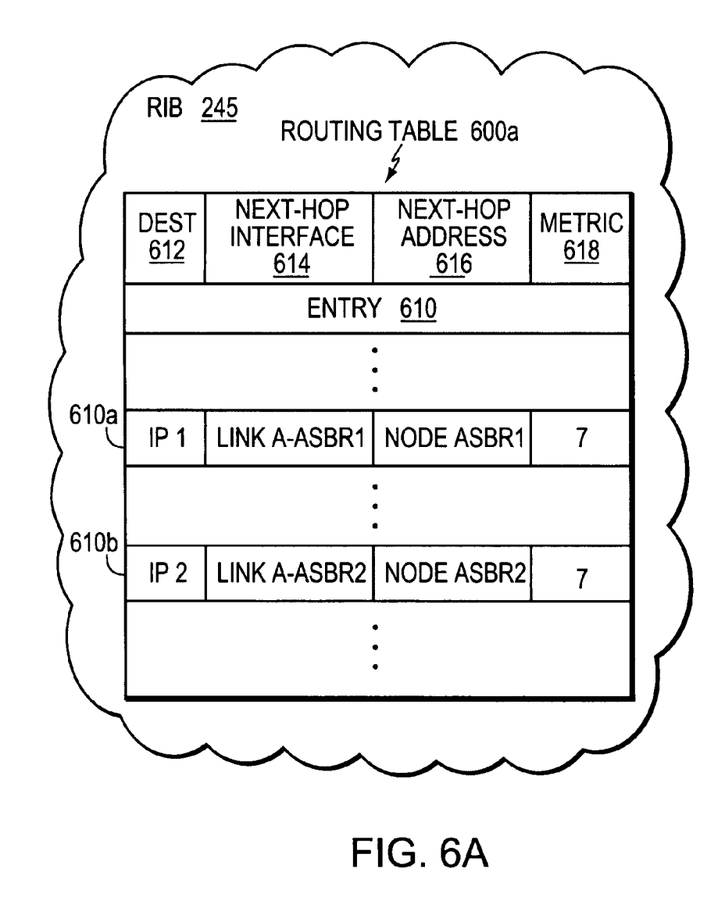
FIG. 6A is schematic block diagram of an exemplary routing table that may be advantageously used with the present invention.

Upon receiving the BGP advertisements 300, the head-end node (node A) extracts the retrieved routing information and uses that information to calculate routes reachable from the tail-end node (node C) for insertion into its routing table 600. It is important to note that the routing information (prefixes and attributes) learned via the BGP advertisements 300 should not be propagated (advertised) outside head-end node, and are for the sole purpose of routing traffic onto the TE-LSP at the head-end node.

FIG. 6A is schematic block diagram of exemplary routing table 600a that may be advantageously used with the present invention. Routing table 600a is illustratively stored in memory 240 and includes one or more entries 610, each comprising a plurality of fields for storing a reachable destination address 612, a next-hop interface 614 and next-hop address 616 to reach that destination, and an associated metric (e.g., cost) 618 of reaching the destination. The routing table 600a is illustratively maintained and managed by RIB 245. To that end, the RIB 245 maintains copies of routes (paths) provided by the routing protocols, such as IGP and BGP, in order to compute best paths/routes for installation into the routing table 600a.

For example, assume that a destination address prefix IP1 is reachable from node A via node ASBR1 (e.g., ultimately through node C), as learned through various BGP and IGP methods known to those skilled in the art. A destination address field 612 of entry 610a contains the reachable address IP1, and the next-hop fields 614, 616, are populated with, e.g., link A-ASBR1 and a loopback address of node ASBR1, respectively. Note that a loopback address of the next-hop node is used as the next-hop address for many reasons, including as a way to avoid depending upon the availability of network interfaces of that node. The cost of IP1 is the advertised cost (e.g., from ASBR1) to the reachable address (plus any cost for node A to reach node ASBR1), e.g., "7." Also for example, assume that another destination address prefix IP2 is reachable from node A via node ASBR2 (e.g., ultimately through node D). A destination address field 612 of entry 610b contains the reachable address IP2, and the next-hop fields 614, 616, are populated with, e.g., link A-ASBR2 and a loopback address of node ASBR2, respectively. The cost of IP2 is the advertised cost, e.g., "7."

Figure 6B:
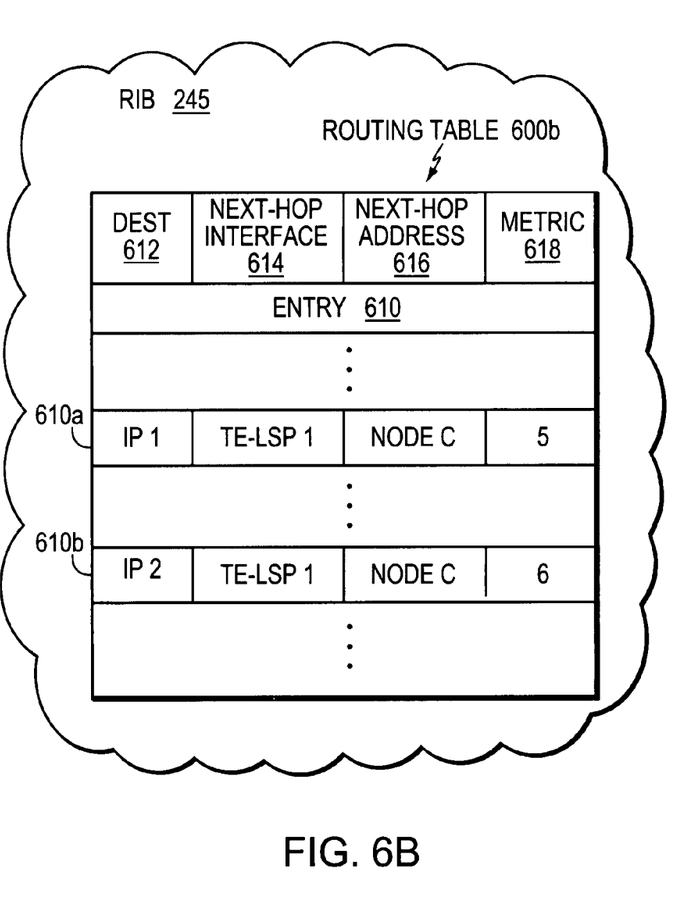
FIG. 6B is schematic block diagram of an updated routing table that may be advantageously used with the present invention.

According to the invention, the RIB 245 "merges" the contents of the BGP advertisements 300 with a respective routing table entry 610a-b for a set of reachable destination addresses in accordance with standard BGP routing techniques. FIG. 6B is schematic block diagram of an updated routing table 600b that may be advantageously used with the present invention. In accordance with the invention, updated routing table 600b contains the reachability information obtained from at least the BGP session between the target node and the head-end node described herein. Specifically, each entry 610 associated with a prefix reachable via the TE-LSP (learned from the special BGP session advertisements 300), e.g., 610a-b, includes destination prefixes 612 reachable from the tail-end node (IP1 and IP2), a reference to the TE-LSP 614 of the target node (TE-LSP 1, or T1), the address of the tail-end node 616 (node C), and a cost metric 618 from the head-end node to the reachable prefix. Illustratively, cost metric 618 is the cost of the TE-LSP (T1) between node A and C, e.g., "4," plus the cost to reach the prefixes from node C, (e.g., "1" for IP1, and "2" for IP2), or "5" and "6," respectively. Notably, the cost metric for the TE-LSP may be greater than, less than, or equal to the IP cost metric of the links, and that the values herein should be taken as examples. Alternatively, the metric fields 618 of the updated routing table 600b may be a cost metric from the tail-end node to the reachable prefix (e.g., "1" or "2"). Also, the metrics 618 may instead contain a metric value of the TE-LSP (e.g., "4"), such as when reachability costs from the tail-end node to the reachable prefix are unavailable.

The updated routing table 600b thus contains prefixes reachable from the TE-LSP, such that traffic may be routed to those prefixes along the TE-LSP. Notably, the head-end node dynamically calculates these routes, such as when updated routing information is received via the special BGP session, as described above. In the event the TE-LSP becomes unavailable (e.g., manually removed or a TE-LSP failure), the prefixes and associated attributes from corresponding entries (610a-b) of the routing table 600b are removed, and the RIB 245 restores the original entries (610a-b) of routing table 600a. In one aspect of the present invention, the prefixes are removed after the TE-LSP has not been restored before the expiration of a predetermined timer. Also, in another aspect of the present invention, a wait-to-restore (WTR) timer may be advantageously used before re-associating prefixes to a restored TE-LSP, in order to avoid multiple traffic disruptions in case of resource flapping.

Figure 7:
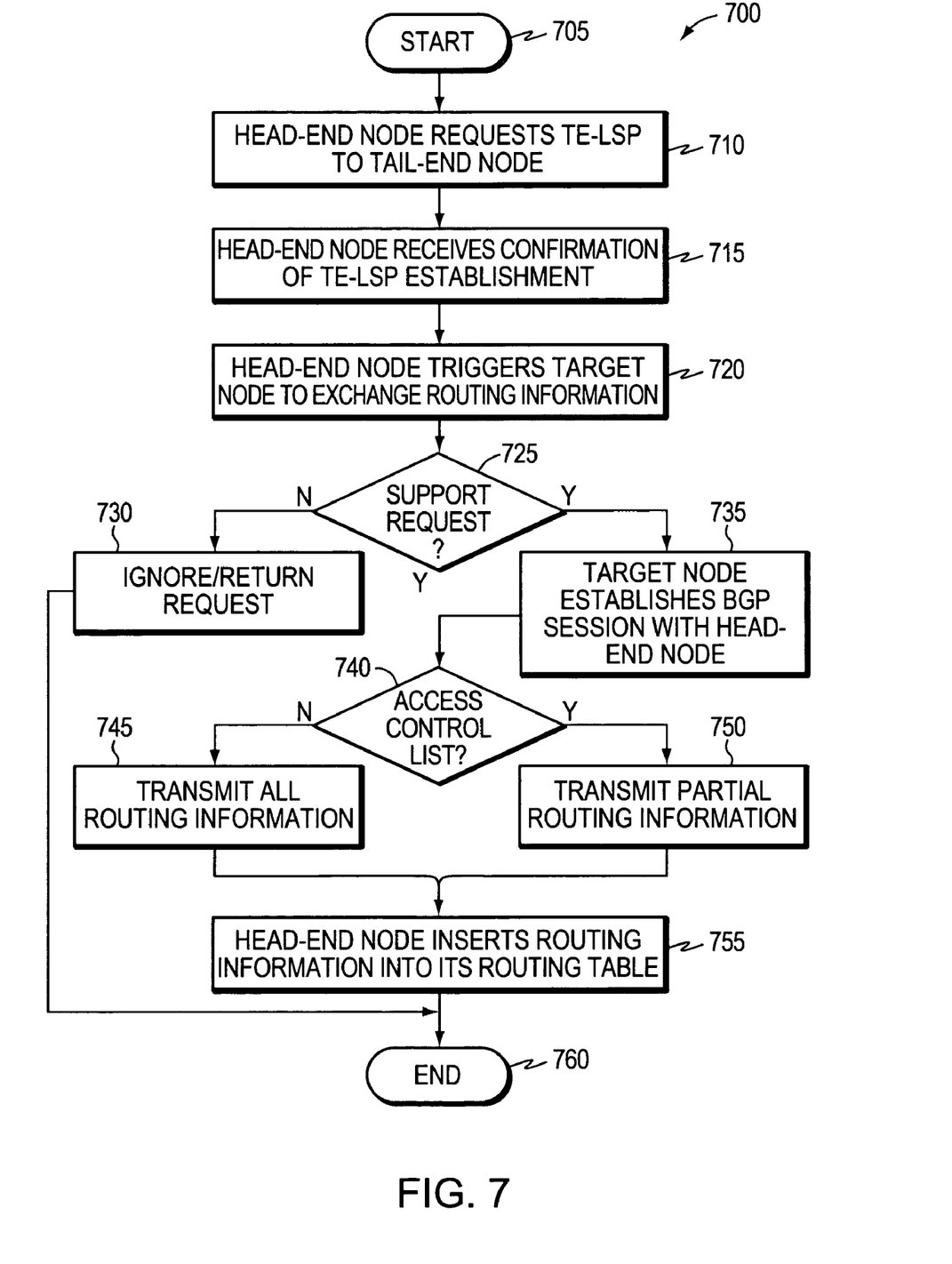
FIG. 7 is a flowchart illustrating a sequence of steps for dynamically triggering an exchange of routing information from a target node to a head-end node in accordance with the present invention.

FIG. 7 is a flowchart illustrating a sequence of steps for dynamically triggering an exchange of reachability information from a target node to a head-end node in accordance with the present invention. The sequence 700 starts at step 705, and continues to step 710, where the head-end node (A) requests that a TE-LSP (T1) be created to the tail-end node (C) using, e.g., an RSVP Path message created with explicit path (user configurable), loose-hop routing, or PCE techniques. The head-end node receives confirmation of the establishment of the TE-LSP in step 715, such as through receipt of an RSVP Resv message. In step 720, the head-end node generates and sends a trigger to a target node (e.g., C) on the TE-LSP requesting the exchange of reachability, i.e., routing, information. The trigger is embodied as an RSVP Path message 400 containing the RI-REQ Object 500 with an asserted BGP-REQ flag 521, and an asserted RI-Supported flag 524. The RI-Supported flag 524 specifies whether the RI-REQ Object is supported. At step 725, the target node specified in target sub-object 525 of the RI-REQ Object determines whether it supports the request/trigger. If at step 725 the receiving target node does not support the routing information request, the target node either ignores the request, or may return the request with a de-asserted RI-Supported flag 524 in step 730 to signify to the head-end node that the request will not be processed. If supported, however, in step 735, the target node establishes a BGP session with the head-end node as described herein. In step 740, the target node determines if the request contains an ACL (ORF) 570 as described above. If no ACL is found, the target node transmits all routing information in step 745 via a BGP advertisement 300. In the event that an ACL is contained within the request, the target node transmits only that partial routing information specified by the ACL in step 750. Upon receiving the routing information, the head-end node inserts the information into its routing table 600 as described herein, and the sequence ends in step 760.

Advantageously, the novel technique dynamically retrieves inter-domain reachability information from a tail-end domain target node along an established TE-LSP at a local domain head-end node of the TE-LSP. By dynamically informing the head-end node of the reachability information of the tail-end node, the inventive technique provides an alternative to sub-optimal routing techniques, such as cumbersome manual configuration (e.g., static routing or policy routing), that can avoid some of the risks and possible errors created in such sub-optimal routing techniques.

While there has been shown and described an illustrative embodiment that dynamically retrieves inter-domain reachability information from a tail-end domain target node along an established TE-LSP at a local domain head-end node of the TE-LSP, it is to be understood that various other adaptations and modifications may be made within the spirit and scope of the present invention. For example, while the above description uses extensions to RSVP signaling messages to trigger the exchange of reachability information, the invention may also be advantageously used with other request/response signaling exchanges, or other messages exchanged between the head-end node and a target node that are known to those skilled in the art that could be readily adapted to accommodate a triggering mechanism as described herein. Notably, the invention has been illustratively shown and described herein using a tail-end node of a TE-LSP as the target node in the tail-end domain. However, the invention in its broader sense is not so limited, and may, in fact, be used with other target nodes along the TE-LSP that have knowledge of the tail-end node routing information (e.g., a border router of the tail-end domain along the TE-LSP).

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for dynamically triggering an exchange of reachability information between a target node of a remote domain along a traffic engineering (TE) label switched path (LSP) and a head-end node of the TE-LSP in a computer network, the method comprising:

establishing a TE-LSP originating from the head-end node in a local domain and extending to a tail-end node in the remote domain, wherein the head-end node is an intra-domain node located internal to the local domain and configured to use one or more interdomain nodes of the local domain to communicate with other domains;

triggering, from the head-end node in response to establishing the TE-LSP, the target node of the remote domain to establish a border gateway protocol (BGP) session with the head-end node;

transmitting reachability information of the tail-end node from the target node to the head-end node through the BGP session;

calculating, at the head-end node, routes reachable from the tail-end node using the reachability information; and inserting the calculated routes into a routing table of the head-end node.

2. The method of claim 1, further comprising: triggering the BGP session via a request/response signaling exchange.

3. The method of claim 2, further comprising: issuing a routing information request (RI-REQ) data structure from the head-end node to the target node to trigger the BGP session.

4. The method of claim 3, further comprising: asserting a BGP request (BGP-REQ) flag in the RI-REQ data structure to trigger the BGP session.

5. The method of claim 2, wherein the request/response signaling exchange is embodied as extensions to Resource ReSerVation Protocol (RSVP) TE signaling messages.

6. The method of claim 1, further comprising: sending an access control list (ACL) from the head-end node to the target node that limits the amount of reachability information to be returned in the BGP session.

7. The method of claim 1, further comprising: delaying for a configurable period of time after the establishment of the TE-LSP prior to triggering the BGP session.

8. The method of claim 1, wherein the TE-LSP spans multiple autonomous systems (ASes).

9. The method of claim 1, wherein the BGP session is embodied as a multi-hop BGP session.

10. A system for dynamically triggering an exchange of reachability information from a target node of a remote domain along a traffic engineering (TE) label switched path (LSP) in a computer network, the system comprising:
a head-end node that is an intradomain node in a local domain and is configured to use one or more interdomain nodes of the local domain to communicate with other domains, the head-end node further configured to establish a TE-LSP that originates from the head-end node and extends to a tail-end node in the remote domain and trigger, in response to establishing the TE-LSP, the establishment of a border gateway protocol (BGP) session;
the target node of the remote domain along the TE-LSP configured to receive the trigger, establish the BGP session with the head-end node, and transmit reachability information of the tail-end node to the head-end node through the BGP session;
a routing information base executing in the head-end node and configured to calculate routes reachable from the tail-end node using the reachability information; and
a routing table of the head-end node configured to store the calculated routes.

11. The system of claim 10, further comprising: a routing information request (RI-REQ) data structure issued from the head-end node to the target node to trigger the BGP session.

12. The system of claim 10, further comprising: a BGP request (BGP-REQ) flag in the RI-REQ data structure to trigger the BGP session.

13. The system of claim 10, further comprising: a BGP advertisement transmitted from the target node to the head-end node to transmit the reachability information.

14. The system of claim 10, further comprising: an access control list (ACL) sent from the head-end node to the target node that limits the amount of reachability information to be returned in the BGP session.

15. The system of claim 10, further comprising: a configurable-length timer, wherein the head-end node begins the timer after the establishment of the TE-LSP and triggers the BGP session after expiration of the timer.

16. An apparatus for dynamically triggering an exchange of reachability information between a target node of a remote domain along a traffic engineering (TE) label switched path (LSP) and a head-end node of the TE-LSP in a computer network, the apparatus comprising:
means for establishing a TE-LSP originating from the head-end node in a local domain and extending to a tail-end node in the remote domain, wherein the head-end node is an intradomain node located internal to the local domain and configured to use one or more interdomain nodes of the local domain to communicate with other domains;
means for triggering, from the head-end node in response to establishing the TE-LSP, the target node of the remote domain to establish a border gateway protocol (BGP) session with the head-end node;
means for transmitting reachability information of the tail-end node from the target node to the head-end node through the BGP session;
means for calculating, at the head-end node, routes reachable from the tail-end node using the reachability information; and
means for inserting the calculated routes into a routing table of the head-end node.

17. A head-end node for dynamically triggering an exchange of reachability information between a target node in a remote domain along a traffic engineering (TE) label switched path (LSP) in a computer network, wherein the head-end node is located internal to a local domain and uses one or more interdomain nodes of the local domain to communicate with other domains, the head-end node comprising:
a processor configured to execute software processes;
a memory configured to store a head-end node process executable by the processor, the head-end node process configured to i) establish a TE-LSP originating from the head-end node and extending to a tail-end node in the remote domain, and ii) trigger, in response to establishing the TE-LSP, the establishment of a border gateway protocol (BGP) session;
a network interface coupled to the processor to receive reachability information of the tail-end node through the BGP session;
a routing information base process stored in the memory and executed by the processor, the routing information base process configured to calculate routes reachable from the tail-end node using the reachability information; and
a routing table in the memory configured to store the calculated routes.

18. The node of claim 17, wherein the head-end node process is further configured to trigger the establishment of the BGP session by issue of a routing information request (RJ-REQ) data structure from the head-end node to the target node.

19. The node of claim 18, wherein the head-end node process is further configured to assert a BGP request (BGP-REQ) flag in the RI-REQ data structure to trigger the BGP session.

20. The node of claim 18, wherein the RI-REQ data structure is embodied as an extension to a Resource ReSerVation Protocol (RSVP) TE signaling message.

21. The node of claim 17, wherein the head-end node process is further configured to send an access control list (ACL) from the head-end node to the target node that limits the amount of reachability information to be returned in the BGP session.

22. The node of claim 17, wherein the head-end node process is further configured to delay for a configurable period of time after the establishment of the TE-LSP before trigger of the BGP session.

23. The node of claim 17, wherein the TE-LSP spans multiple autonomous systems (ASes).

24. The node of claim 17, wherein the BGP session is embodied as a multi-hop BGP session.

* * * * *

UNITED STATES PATENT AND TRADEMARK OFFICE
CERTIFICATE OF CORRECTION

PATENT NO. : 7,616,574 B2
APPLICATION NO. : 11/081097
DATED : November 10, 2009
INVENTOR(S) : Stefano B. Previdi

It is certified that error appears in the above-identified patent and that said Letters Patent is hereby corrected as shown below:

Col. 18, Line 42, please amend as shown:

~~(RJ-REQ)~~(RI-REQ) data structure from the head-end node to the target

Signed and Sealed this

Eighth Day of June, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,616,574 B2 |
| APPLICATION NO. | : 11/081097 |
| DATED | : November 10, 2009 |
| INVENTOR(S) | : Previdi et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 891 days.

Signed and Sealed this

Nineteenth Day of October, 2010

David J. Kappos
*Director of the United States Patent and Trademark Office*